US008700662B2

(12) United States Patent
Cara et al.

(10) Patent No.: US 8,700,662 B2
(45) Date of Patent: Apr. 15, 2014

(54) DYNAMIC PROFILE SYSTEM FOR RESOURCE ACCESS CONTROL

(75) Inventors: Fabrizio Cara, Rome (IT); Alessandro Orsano, Rome (IT); Gianluca D'Angelo, Naples (IT); Alessandro Cotroni, Rome (IT)

(73) Assignee: Accenture Global Services Limited, Dublin (IE)

( * ) Notice: Subject to any disclaimer, the term of this patent is extended or adjusted under 35 U.S.C. 154(b) by 931 days.

(21) Appl. No.: 12/120,105

(22) Filed: May 13, 2008

(65) Prior Publication Data

US 2009/0222405 A1  Sep. 3, 2009

(30) Foreign Application Priority Data

Feb. 29, 2008  (EP) ..................................... 08425130

(51) Int. Cl.
*G06F 7/00* (2006.01)
*G06F 17/30* (2006.01)

(52) U.S. Cl.
USPC .......................................................... 707/781

(58) Field of Classification Search
None
See application file for complete search history.

(56) References Cited

U.S. PATENT DOCUMENTS

| 6,263,064 | B1 * | 7/2001 | O'Neal et al. ........... 379/201.03 |
| 6,789,110 | B1 | 9/2004 | Short et al. |
| 6,944,150 | B1 | 9/2005 | McConnell et al. |
| 2002/0033416 | A1 * | 3/2002 | Gerszberg et al. ............ 235/380 |
| 2002/0075844 | A1 * | 6/2002 | Hagen ............................ 370/351 |
| 2002/0112009 | A1 * | 8/2002 | Capers et al. .................. 709/206 |
| 2002/0120697 | A1 * | 8/2002 | Generous et al. .............. 709/206 |
| 2002/0129153 | A1 * | 9/2002 | Fleming ........................ 709/230 |
| 2003/0140131 | A1 * | 7/2003 | Chandrashekhar et al. ... 709/223 |
| 2003/0217158 | A1 | 11/2003 | Datta |
| 2004/0063497 | A1 * | 4/2004 | Gould .............................. 463/42 |
| 2004/0228363 | A1 * | 11/2004 | Adamczyk et al. ........... 370/468 |
| 2006/0106936 | A1 * | 5/2006 | De Luca et al. ............... 709/228 |
| 2006/0143440 | A1 * | 6/2006 | Ponnapalli et al. ........... 713/155 |
| 2007/0123253 | A1 | 5/2007 | Simongini et al. |

FOREIGN PATENT DOCUMENTS

WO  WO 2004/047399 A1  6/2004

OTHER PUBLICATIONS

European Patent Office Communication dated Nov. 11, 2008 for co-pending European Patent Application No. 08425130.5.
Canandian Patent Office First Examiner's Report dated Jun. 3, 2011 for co-pending Canadian Patent Application No. 2,656,646.
Canadian Patent Office Examiner's Report dated Jul. 11, 2012 for pending Canadian Patent Application No. 2,656,646.

(Continued)

*Primary Examiner* — Taelor Kim
(74) *Attorney, Agent, or Firm* — Brinks Gilson & Lione

(57) ABSTRACT

A dynamic profiling system (DPS) provides dynamic access session configuration for telecommunications subscribers, and provides subscriber session information to application platforms. The DPS configuration adapts to meet the needs of any combination of user connection requests, access channel devices, and access channels used to communicate connection requests. The DPS provides an aggregated view of user session information to efficiently and effectively provide services to subscribers. As the many different access channels (e.g., WiFi™ channels, Ethernet™ channels, and Digital Subscriber Line (DSL) channels continue to grow through which a subscriber connects to services, the dynamic profiling system also eliminates the inefficient proliferation of custom interfaces between the many support systems and applications that need access to subscriber profile and session configuration information. The DPS provides a universal and personalized access to telecommunications services. Provisioned services may be accessed by many different access channels based upon static and dynamically maintained information in the subscriber profile and the access channel used, respectively.

16 Claims, 12 Drawing Sheets

(56) References Cited

OTHER PUBLICATIONS

Office Action dated Jan. 17, 2013, from corresponding Chinese Patent Application No. 200910118533.9, 11 pages.

Office Action dated Aug. 1, 2013 for corresponding Canadian Application No. 2,656,646, 4 pages.

Office Action dated Sep. 17, 2013 for corresponding Indian Application No. 311/MUM/2009, 6 pages.

* cited by examiner

700

| Asynchronous Transfer Mode (ATM) Technical Key Information | | 702 |
|---|---|---|
| Acct-Session-Id 704 | Password | 716 |
| NAS-Identifier 706 | Service-Type | 718 |
| NAS-IP-Address 708 | Vendor-VSA-Port-String | 720 |
| NAS-Port 710 | Connect-Info | 722 |
| NAS-Port-Type 712 | Framed-Protocol | 724 |
| Username 714 | | |

| Ethernet Technical Key Information | | | 802 |
|---|---|---|---|
| NAS-Identifier | 804 | Username | 816 |
| NAS-Port-Id | 806 | Password | 818 |
| NAS-IP-Address | 808 | Service-Type | 820 |
| NAS-Port | 810 | Acct-Session-Id | 822 |
| NAS-Port-Type | 812 | Connect-Info | 824 |
| Calling-Station-Id | 814 | Framed-Protocol | 826 |

Figure 8

DYNAMIC PROFILE SYSTEM FOR RESOURCE ACCESS CONTROL

BACKGROUND OF THE INVENTION

1. Priority Claim

This application claims the benefit of priority to EPO application Serial No. 08425130.5 filed on Feb. 29, 2008.

2. Technical Field

This disclosure concerns a system and method for providing dynamic access session configuration information for telecommunications subscribers, and subscriber access notifications that include user session information for application platforms. In particular, this disclosure relates to an efficient and effective way to dynamically configure, register and notify an application platform of access session parameters for telecommunications subscribers so that provisioned services may be accessed by many different access channels based upon static and dynamically maintained information in the subscriber profile and the access channel used by the subscriber, respectively.

3. Background Information

Rapid advances in computer system and telecommunications technology have lead to a vast array of access channels used by consumers to access telecommunication services. Such access channels include wireline, Ethernet™, WiFi™ and asynchronous transfer mode (ATM) channels, and many other channels. Similarly, consumers use an immensely broad spectrum of devices to communicate over the access channels, including cell phones, personal data assistants (e.g., Blackberry™ devices), computers, television set top boxes, satellite transceivers, and gaming systems (e.g., the Playstation 3™ console), each of which has its own characteristics and capabilities. Furthermore, many consumers use multiple and concurrent access channels and devices to access services using a single account or subscriber profile.

The hardware underlying the access channels implements circuit switched connections, packet switched connections, and other types of connections. In addition, a wide range of communication protocols and access technologies further govern the transfer of data on the connections. Asymmetric Digital Subscriber Line (ADSL), Multi-protocol Label Switching (MPLS), Virtual Private Networks (VPNs), and other technologies are several examples of a wide array of access technologies for telecommunications services.

Growing support of new and existing telecommunications services and the wide range of access channels used to access those services have led to an extensive dispersal of subscriber profile information between many different operation support systems (OSS) that support the services and various access session configurations needed to access the services. The dispersal of subscriber profile information and access channel configurations leads to the inefficient proliferation of custom interfaces between systems and applications that need the profile information to authorize or authenticate access, determine which services are subscribed, and determine how to configure access to the services. Thus, in the past there was no sufficiently secure, flexible, and efficient mechanism that met the technical challenges associated with providing a single point of access to subscriber profile information, dynamically configuring access channel parameters to accommodate the immense number of combinations and permutations of access devices and access channels, and providing application platforms an aggregated view of subscriber profile and network access information with a common interface.

A need has long existed for a system and method for a telecommunications service provider to efficiently and dynamically configure multiple different access channels used by subscribers to access services, and provide real-time notification of subscriber connection events.

SUMMARY

The Dynamic Profiling System (DPS) coordinates user access to telecommunication services. The DPS matches services subscribed to by a user to real-time user information from the network (e.g., access location information, session type, and quality of service needed by the user) to provide the appropriate type of access and optimize the Quality of Service (QoS) used to deliver services to the user. The DPS provides an interface between a user service profile and the network so that the user can access the network using any number of access channels (e.g., wireline, Ethernet™, a WiFi™ and asynchronous transfer mode (ATM)) over any type of device such as a game console, cell phone, personal data assistant, or other device. The DPS performs quality of service (QoS) analysis to ensure the optimal service is provided to the user.

The DPS includes a unified profiling database, technical key processing logic, access parameter setting logic and presence routing logic to coordinate telecommunication service access by users. The unified profiling database includes a user service profile record of user service profile data. The user service profile data includes static and dynamic connection information for multiple different access channels (e.g., an X-box™ system, wireline channel, Ethernet™ channel, WiFi™ channel and ATM channel). In one implementation, the static connection information includes the username, authentication information (e.g., surname, address, city of birth), subscribed services, contact information (e.g., telephone number and alternative e-mail address). The dynamic connection information may include the internet protocol (IP) address allocated to the user, the access channel used by the user, a user account identifier and the device used by the user to access the network.

The technical key processing logic receives a technical key that is generated in response to a user connection request through a specific access channel, and extracts user identifying information from the technical key. For example, the user identifying information may include a password and a username. The user identifying information may further include a network access server port type and a network access server identifier. The technical key processing logic extracts an access channel identifier of the specific access channel from the technical key and requests retrieval, based on the user identifying information, of the user service profile record from the unified profiling database. The technical key process logic distinguishes between a wireless access request technical key, an asynchronous transfer mode access technical key, and an Ethernet access request technical key. In one implementation, the technical key process logic distinguishes between all access technical key types generated in response to user connection requests corresponding to multiple different access channels. The technical key may include wireless access point access request parameters. In one implementation, the access channel identifier includes a network access server identifier, a network access server internet protocol address, and a network access server port identifier.

The access parameter setting logic determines the static and dynamic connection information applicable to the specific access channel and access channel device from the user service profile record based on the access channel identifier. The access parameter setting logic sets an access parameter for the specific access channel and access channel device according to the static and dynamic connection information obtained based on the access channel identifier. The access parameters may include web site access constraints, an internet protocol address and an internet protocol address type identifier that distinguishes between 'static' and 'dynamic' address types.

The access parameter setting logic may determine the access parameters to set based on service provider preferences and the services offered by the service provider. In one implementation, the access parameter setting logic analyzes the user service profile, session type (e.g., Voice, Data and Video), access channel, access device, and the status of the user. The access parameters may include a maximum user session speed assigned for the specific access channel in the user identifying information. For example, the access parameter setting logic determines the maximum upstream and downstream bandwidth utilization for a user based on whether the user profile has a 2 MB or 20 MB bandwidth capacity, the user access is fixed (hardwire) or WiFi™ access, and the user session is a voice or data session.

In one implementation, the access parameters include Domain Name Server (DNS) parameters and web surfing constraints that establish an access control list. For example, the access parameter setting logic may configure the DNS parameters and surfing constraints to force a user to perform specific tasks such as creating an e-mail account upon activation of an account, and automate the generation of a Welcome Letter to a user following the activation of a new commercial profile or new marketing solicitation. The access parameter setting logic may configure the DNS parameters and surfing constraints to automatically perform a credit recharge for pre-paid services where a credit balance has been depleted by a user. The access parameter values set by the access parameter setting logic may vary depending on the tasks that a service provider desires to have performed in order to provision service.

The presence routing logic analyzes static and dynamic connection information based on an application platform, determines user location information and user session information for dynamic adaptation of a user session configuration based on the static and dynamic connection information, and provides the application platform the user session information for dynamic adaptation of the user session configuration. The presence routing logic provides the unified profiling database with connection event information (e.g., start and stop connection events information) that includes user service profile data. The user service profile data may be communicated real-time to an application platform (e.g., resource and admission control subsystem (RACS) and QoS server) over standard interfaces, allowing remote provisioning of customer site equipment, revenue assurance and traffic performance management, and management of pre-paid customer credit. In one implementation, the presence routing logic allows implicit services authentication (e.g., web e-mail) by using user credentials and subscribed services associated with a user IP address to authenticate a user's access to particular services. Application platforms may, for example, perform user authentication by retrieving user credentials from DPS based on an IP address associated with the user without requiring user interaction by analyzing user session information. The presence routing logic may enable dynamic adaptation of a user session configuration by communicating permissible user QoS profiles to an application platform (e.g., a QoS server) and/or providing user location information to perform call routing.

The DPS solves the extraordinary technical problems associated with dynamically configuring multiple different access channels used by subscribers, who connect to services using an immense array of devices communicating over many different access channels, to access services by analyzing static and dynamic user service profile and access channel information and dynamically associating static and dynamic information related to a user session.

Other systems, methods, features and advantages will be, or will become, apparent to one with skill in the art upon examination of the following figures and detailed description. All such additional systems, methods, features and advantages are included within this description, are within the scope of the invention, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the capability analysis techniques. In the figures, like-referenced numerals designate corresponding parts throughout the different views.

FIG. 7 illustrates technical key information for a asynchronous transfer mode (ATM) technical key type.

FIG. 8 illustrates technical key information for an Ethernet technical key type.

DETAILED DESCRIPTION OF THE PREFERRED EMBODIMENTS

Although selected aspects, features, or components of the implementations are depicted as stored in computer-readable memories (e.g., as computer-executable instructions), all or part of the systems and structures may be stored on, distributed across, or read from other computer-readable media. The computer-readable media may include, for example: secondary storage devices such as hard disks, floppy disks, and compact disc read only memories (CD-ROMs); or other forms of memory, including read-only memory (ROM) or random access memory (RAM), either currently known or later developed.

Various implementations of the digital signal processor (DPS) may include additional or different components. A processor may be implemented as a microprocessor, a microcontroller, a DSP, an application specific integrated circuit (ASIC), discrete logic, or a combination of other types of circuits or logic. Similarly, memories may be Dynamic Random Access Memory (DRAM), Static Random Access Memory (SRAM), Flash or any other type of memory. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be combined or split among multiple programs, or distributed across several memories and processors.

Figure 1:
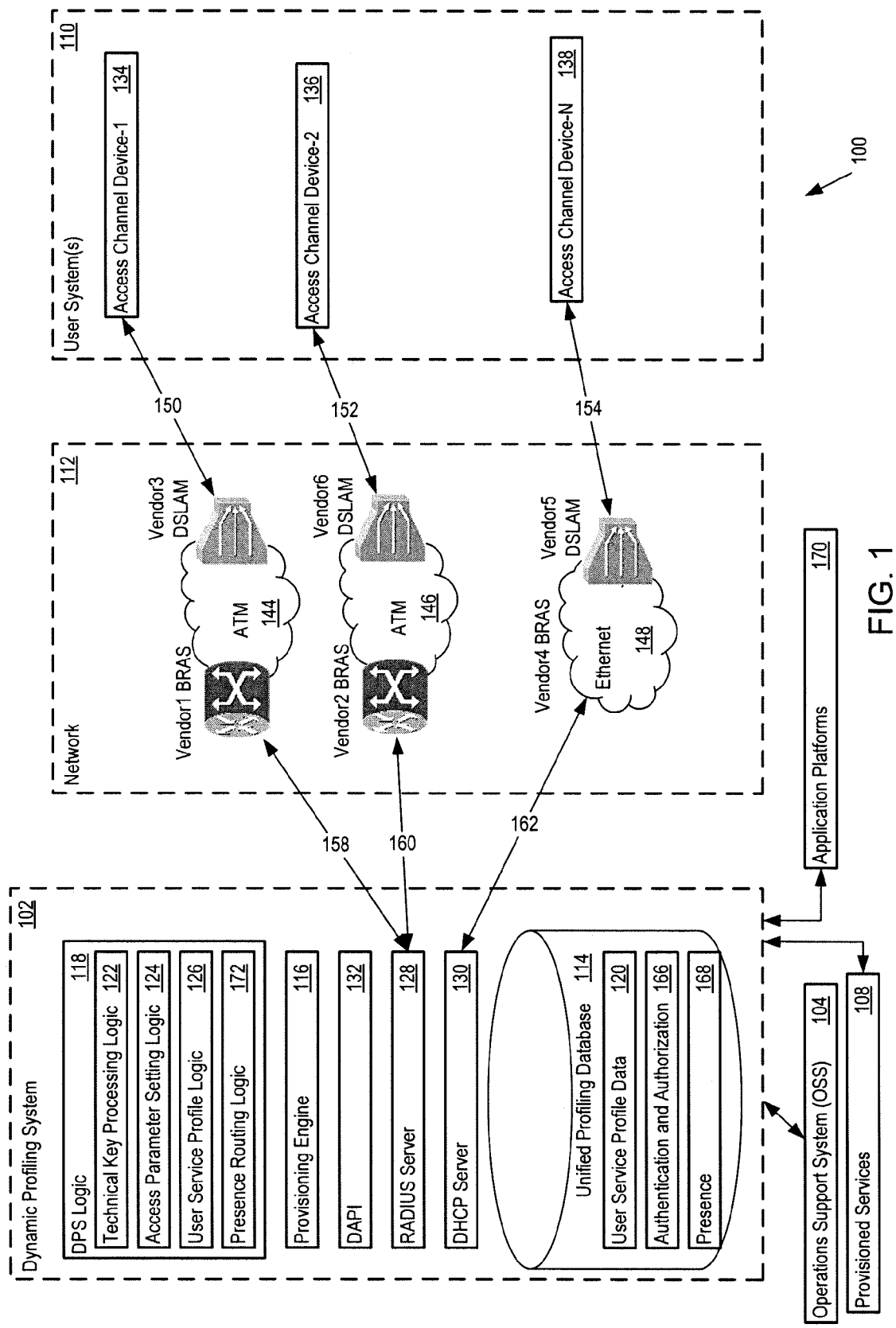
FIG. 1 shows an implementation of the dynamic profiling system configuration.

FIG. 1 shows one implementation of the dynamic profiling system (DPS) configuration 100. The DPS configuration 100 includes a DPS 102, an operations support system (OSS) 104, provisioned services 108, user system(s) 110, and a network 112. In one implementation, the DPS 102 employs a unified profiling database 114, provisioning engine 116, and DPS logic 118 to provision services through the OSS 104. The DPS 102 employs the unified profiling database 114 as an internal repository containing user and service information for provisioning services. The OSS 104 communicates user service profile data 120 to the DPS configuration 100 that is stored in the unified profiling database 114. In one implementation, the DPS configuration 100 includes application platforms 170 (e.g., a resource and admission control subsystem (RACS) and a QoS server).

The user service profile data 120 may include calling line identifier information (e.g., a telephone number used by a user to access services), asymmetric digital subscriber line (ADSL) user IDs, services configurations, and DSL line configurations. In one implementation, the unified profiling database 114 employs an authentication and authorization 166 repository and a presence 168 repository to authenticate and verify that a user has authorization to request and/or use services and locate and identify the status of a user associated with the network.

In one implementation, the DPS logic 118 includes technical key processing logic (TKPL) 122, access parameter setting logic (APSL) 124 user service profile logic (USPL) 126, and presence routing logic (PRL) 172, discuss in detail below. The DPS 102 may also include a remote authentication dial in user service (RADIUS) server 128, a dynamic host configuration protocol (DHCP) server 130, and a DAPI (DHCP Authentication and Presence Interface) 132. The DPS 102 may employ the RADIUS server 128, DHCP server 130 and DAPI 132 to manage network events from any type of broadband access network over DHCP and RADIUS protocols.

In one implementation, the user system(s) 110 represents a single user system with multiple access channel devices (e.g., 134, 136, 138, 140). In another implementation, the user system(s) 110 represents multiple user systems for a given user where each user system includes a different access channel device. For example, an individual user may use both an Ethernet modem and a Broadband modem on a single laptop to access network services, or the user may only use a laptop with a broadband modem and a desktop system with an Ethernet modem to access network services. The access channel devices (e.g., 134, 136, 138, 140) initiate user connection requests through the networks 112.

In one implementation, the network 112 includes multiple access channels, including: asynchronous transfer mode (ATM) access channels (e.g., 144, 146, 148) for different vendors; and an Ethernet access channel 148. For example, the ATM access channel 144 may include a vendor3 digital subscriber line multiplexer (DSLAM) and a vendor1 broadband remote access server (BRAS). The access channel device (e.g., 134, 136, 138) used by the user to initiate a user connection request sends the connection request to a corresponding access channel (e.g., 150, 152, 154), the communication of which is represented by the arrows from the access channel devices (134, 136, 138) to the access channels (144, 146, 148). Responsive to a connection request, an access channel generates a technical key (e.g., 158, 160, 162), the communication of which is represented by the arrows from the access channels (144, 146, 148) to the RADIUS server 128 and the DHCP server 130. In one implementation, the DPS 102 receives a technical key generated through an access channel responsive to a user connection request via the RADIUS server 128 and/or DHCP server 130.

The DPS 102 authenticates the user and provides a unified user profile matching of static and dynamic user information across different access channels. The DPS 102 provides the user access to the network by setting access parameters that may include: maximum up/downstream speed; multi-session and session type data (e.g., voice, data, and video); Domain Name Server (DNS) parameters and web surfing constraints (Access Control List—ACL); and IP pool assignments and IP address type (static or dynamic).

The DPS 102 sets access parameters to configure one or more access channels for a user. Accordingly, for example, in one session the user may connect to a network using a high-speed wireline and in another session the user may connect using a slow-speed WiFi access point. In either instance, the DPS 102 sets the relevant access parameters to intelligently adapt the connection for the access channel and device.

Table 1 illustrates an example of maximum user session speed parameters for different access channels. The DPS 102 may set the parameters in a RADIUS Access-Accept message for Point-to-Point Protocol over Ethernet (PPPoE) access. The speed tag values speed1 and speed2 may be pre-selected and established for wireline and WiFi access, respectively. When the DPS 102 includes a maximum user session speed parameter in the RADIUS Access-Accept message for each type of broadband remote access server (BRAS) corresponding to the access channels available (e.g., Vendor1 BRAS and Vendor2 BRAS) for use by the user, the appropriate BRAS activates a predefined policy dynamically associated with the user session.

TABLE 1

| RADIUS Access-Accept message |
|---|
| Vendor1-Qos-Profile-Name=ppp__adsl__<speed1> → in case of Vendor1 BRAS |
| Vendor2-Policy-Down = ppp__adsl__<speed2> → in case of Vendor2 BRAS |

Figure 2:
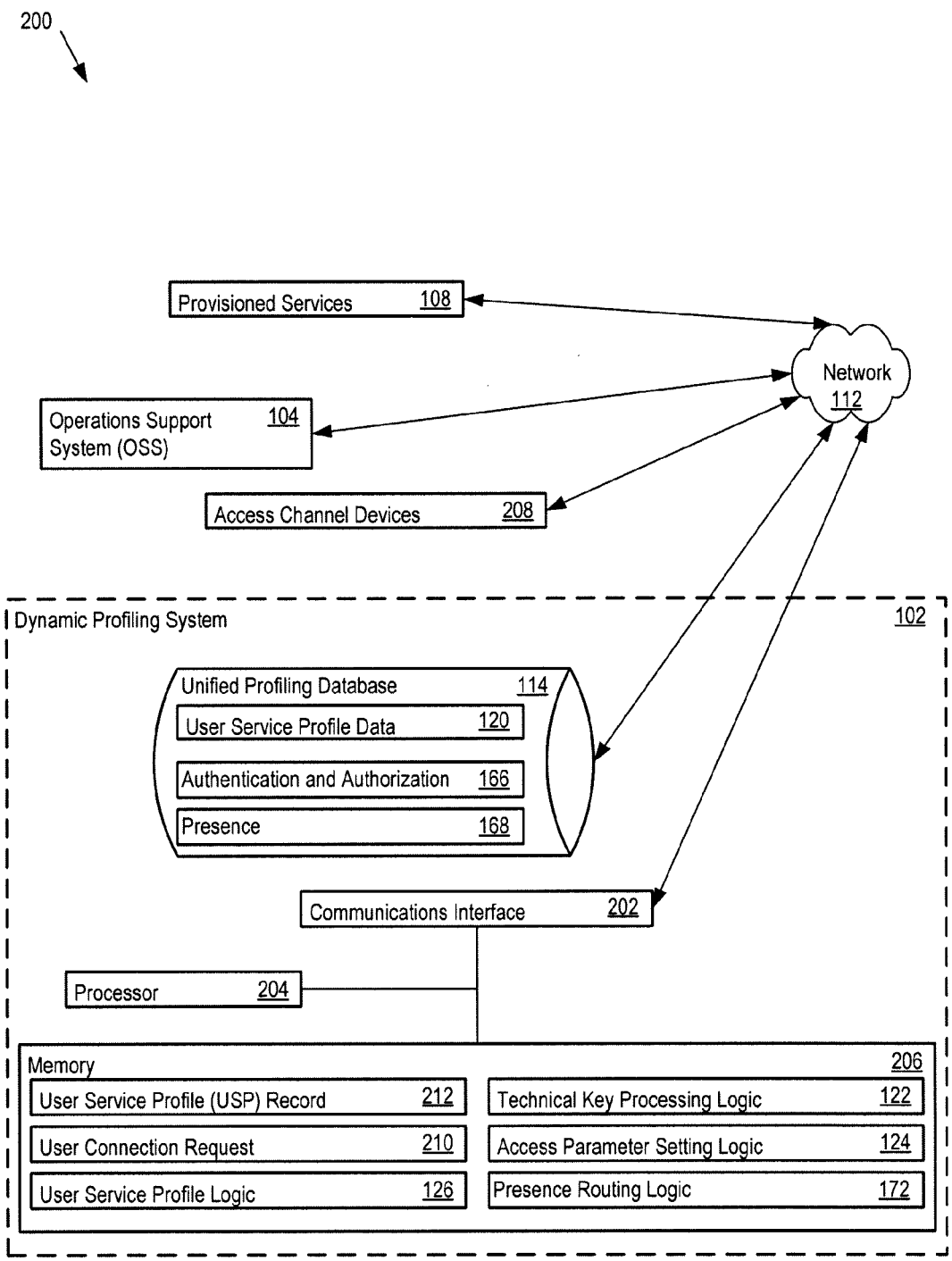
FIG. 2 illustrates an implementation of the dynamic profiling system.

FIG. 2 illustrates one implementation of the DPS 102 that includes a communications interface 202, a processor 204 and a memory 206. The communications interface 202 manages communication between the DPS 102 and the OSS 104, provisioned services 108 and access channels (e.g., 144, 146, 148) in the network 112. The DPS 102 employs the processor 204 to invoke the TKPL 122, APSL 124, PRL 172 and USPL 126 to dynamically configure session access parameters for a subscriber based on a user connection request 210 and communicate user connection events to application platforms. In one implementation, the communications interface 202 includes and/or coordinates communication with the DAPI 132 to manage network events.

Figure 3:
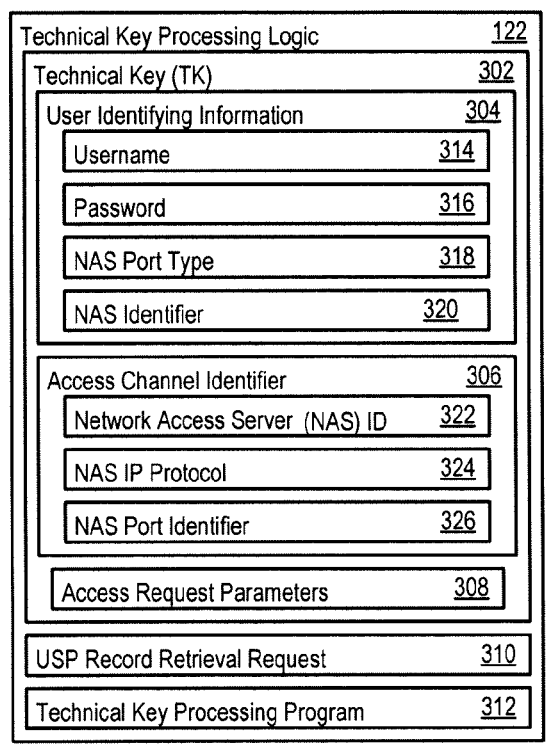
FIG. 3 shows an implementation of the technical key processing logic.

FIG. 3 shows one implementation of the technical key processing logic (TKPL) 122. The access channels (e.g., asynchronous transfer mode (ATM) access channels (144, 146) for different vendors; and an Ethernet access channel 148) may each generate a technical key 302. The TKPL 122 includes a technical key processing program (TKPP) 312 that extracts user identifying information 304, an access channel identifier 306 and access request parameters 308.

With the user identifying information 304, an access channel identifier 306 and access request parameters 308, the TKPP 312 generates a USP record retrieval request 310. The user identifying information 304 may include a username 314, a password 316, a network access server (NAS) port type 318, and a NAS identifier 320. The access channel identifier 306 may include a NAS identifier 322, a NAS IP protocol 324, and a NAS port identifier 326. In one implementation, the TKPL 122 includes a TKPP 312 that distinguishes between all access channel technical key types corresponding to multiple different access channels 208. For example, the TKPL 122 distinguishes between an asynchronous transfer mode (ATM) access technical key and an Ethernet access request technical key.

Tables 2-4 illustrate examples of technical key information that may be received by the TKPL 122 from three different access requests technical key types, including a WiFi access request technical key, an ATM access technical key, and an Ethernet access request technical key, respectively. Each of the different types of technical keys may include fewer, more, and/or different types of information. Table 2 shows some of the technical information that the TKPP 312 may extract from a WiFi access request technical key.

TABLE 2

WiFi Technical Key Information

Service-Type = Authenticate-Only
NAS-IP-Address = 12.34.56.78
NAS-Port-Type = Wireless-IEEE-802-11
NAS-Identifier = "T1-1234-WIFI"
Class = "WiFi"
Username = "testwifi@wifiprovidername.xyz"
Password = "testwifi"

Table 3 illustrates technical key information that the TKPP 312 may extract from an ATM access technical key.

TABLE 3

ATM Technical Key Information

Acct-Session-Id = "1/2/3/45.67__8901234"
NAS-Identifier = "R-RM0123.xyz.atmprovidername.xyz"
NAS-IP-Address = 34.56.78.90
NAS-Port = 1234567890
NAS-Port-Type = Virtual
Username = username@123.xyz
Password = "testatm"
Service-Type = Framed-User
Vendor-VSA-Port-String = "1/2/3/45.67"
Connect-Info = "ppp_auto123"
Framed-Protocol = PPP Table 4 illustrates access request parameters that the TKPP 312 may extract from an Ethernet type technical key.

TABLE 4

Ethernet Technical Key Information

Figure 4:
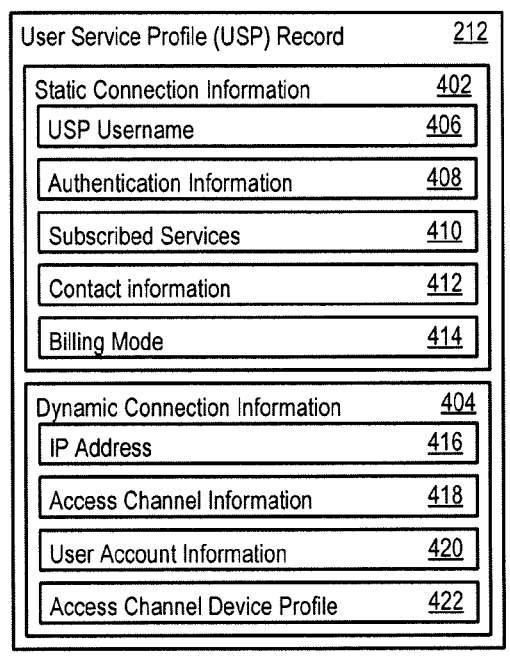
FIG. 4 shows an implementation of the user service profile record.

NAS-Identifier = BRAS-NAME
NAS-Port-Id = "ROMA-012 atm 01/23/45/33:8.35"
NAS-IP-Address = 67.56.78.90
NAS-Port = 3456789012
NAS-Port-Type = Ethernet
Calling-Station-Id = 45.67.89.12
Username = username@345.xyz
Password = "testethernet"
Service-Type = Framed-User
Acct-Session-Id = "12/34/567__1234567"
Connect-Info = speed:UBR
Framed-Protocol = PPP FIG. 4 shows one implementation of a user service profile (USP) record 212. The DPS 102 retrieves a USP record 212 from the user service profile data 120 in the unified profiling database 114, in response to the USP record retrieval request 310. In one implementation, the USP record 212 includes static connection information 402 and dynamic connection information 404. The static connection information 402 specifies user profile information that identifies a user and the account(s) of the user generally, while the dynamic connection information 404 specifies information directed to a particular connection being used by the user during a particular instance.

The static connection information 402 may include a USP username 406, authentication information 408 (e.g., date of birth, maiden name of mother), subscribed services 410, contact information 412 (e.g., primary phone number and mailing address), and billing mode 414. The dynamic connection information 404 may include the Internet Protocol (IP) address 416 used by the user, access channel information 418, user account information 420, and an access channel device profile 422. The access channel information 418 may include quality of service statistics and/or status information to assess the QoS of the access channel. The user account information 420 may track the available credit balance and/or the resources used to-date information (e.g., minutes and bandwidth used during a particular billing period). The access channel device profile 422 may define the vendor, the version of the access device and/or logic used to operate the access device, and/or any other device specific information available that defines the access channel device 208.

Figure 12:
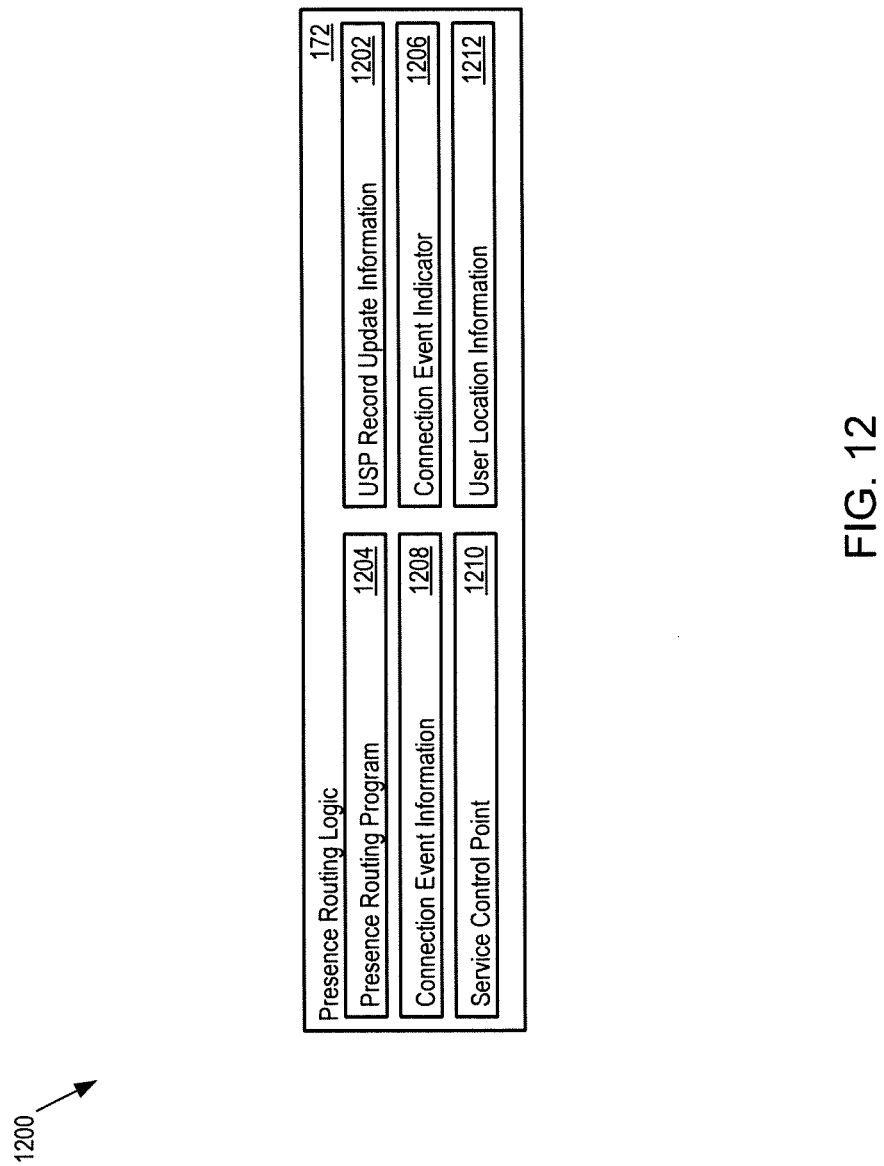
FIG. 12 shows an example of the presence routing logic.

Referring briefly to FIG. 12, which shows an example of the presence routing logic (PRL) 172, the DPS 102 may employ the PRL 172 to provide USP record update information 1202. The PRP 1204 may include a connection event indicator 1206 to indicate that a connection event 1208 has occurred (e.g., a start connection event and/or a stop connection event). The connection event 1208 may occur as a result of a user connection request 210 and/or an application platform 170. The PRP 1204 may include connection event information from the connection event 1208 in the USP record update information 1202, and the USP record update information 1202 may be included in the USP record 212 in the static connection information 402 and/or the dynamic connection information 404. The PRL 172 may further include a service control point 1210 that determines user location information 1212. The user location information 1212 may include the geographic location and/or the logical network topology location of the user. In one implementation, the service control point 1210 determines the user location information 1212 by analyzing the calling line identifier information (e.g., a telephone number used by a user to access services) from the user service profile data 120, the IP address 416 used by the user and the NAS-IP Address (e.g., 606, 708, and 808) of the access channel (e.g., 144, 146 and 148) being used by the user.

For example, when a user calls an emergency number associated with a particular service (e.g., provisioned service 108) the DPS 102 may route the call to the services center closest to the user's location. Prior to the call, the user may perform a user connection request 210 in which the DPS 102 authenticates the user and sets access parameters 504 with the appropriate grants to access the network 112. The PRP 1204 processes the user connection event 1208 including user session information. The user calls the emergency number associated with a provisioned service 108 (e.g., web e-mail) as a result of an unsuccessful attempt to access the provisioned service. The PRP 1204 determines the user location information 1212 using the service control point 1210, and provides the user location information 1212 to the DPS 102. In one implementation, the DPS 102 routes the call to services center closest to the user's location. The DPS 102 may configure call routing to route calls (e.g., emergency calls and general service calls) to service centers based on any number of preferences. In one implementation, the DPS 102 may route calls in order to load balance calls among service centers, and/or route calls to service centers responsible for servicing particular geographical and service issue categories.

In one implementation, the PRL 172 facilitates the DPS 102 to perform dynamic adaptation of a user session configuration. For example, the user performs a connection request 212 and the PRP 1204 processes the user connection event 1208 including user session information. The user interacts with a provisioned service 108 and initiates the download of content (e.g., streaming video) that may impose a need for an increase bandwidth. In one implementation, the user initiates a request to increase the bandwidth for a predefined period (e.g., during the download of a large file). In another implementation, without the user initiating a request for an increase in bandwidth, the DPS 102 analyzes the USP record 212 and access parameters 504 (e.g., QoS 522) to determine whether the user session may have an increase in bandwidth. The provisioned service 108 may communicate the increase bandwidth request to the application platforms 170 (e.g., a resource and admission control subsystem (RACS)) and the DPS 102 provides the QoS profile to the RACS to confirm that the bandwidth increase is permissible. The applications platforms 170 (e.g., QoS server) may dynamically update the user session configuration and the RACS provides temporary network adaptation for user session.

Figure 5:
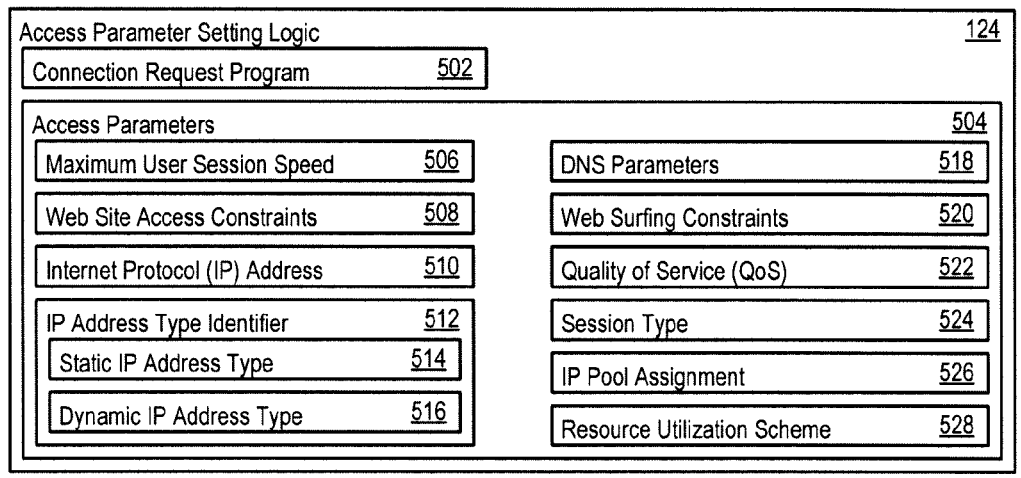
FIG. 5 illustrates an example of the access parameter setting logic.

FIG. 5 illustrates an example of the access parameter setting logic (APSL) 124. In one implementation, the APSL 124 uses a connection request program 502 to determine the static information 402 and dynamic information 404 applicable to the specific access channel (e.g., access channel identifier 306) from the USP record 212. The APSL 124 may use the connection request program 502 as an analyzer to validate the connection request 210 against the USP record 212, by analyzing the static information 402 and dynamic information 404 and the access parameters of the access channel. In another implementation, the connection request program 502 determines whether a provisioned service 108 allows a network configuration adaptation, so that although a connection request 210 may indicate a request for a provisioned service 108 that is not currently provisioned for the user the access channel and/or network may provision the service. For example, user account information 420 may indicate that a user is pre-authorized to use any number of available services, although the user is configured to normally use some sub-set of provisioned services 108. In another example, the billing mode 414 may indicate that a user is pre-authorized to use any number of available services, although the user is configured to normally use a specific provisioned service 108. The connection request program 502 may analyze the technical key 212 based on the current values of the specific access channel parameters (e.g., 506, 508, 510, 512, 514, 516, 518, 520, 522, 524, 526, 528). The connection request program 502 may determine the access parameters to set for the specific access channel in order to satisfy the connection request 210, and/or information found in the technical key 302. The connection request program 502 validates the current values of the access parameters (e.g., 506, 508, 510, 512, 514, 516, 518, 520, 522, 524, 526, 528) and sets the specific access channel parameters to the appropriate value to satisfy the connection request 210.

Figure 6:
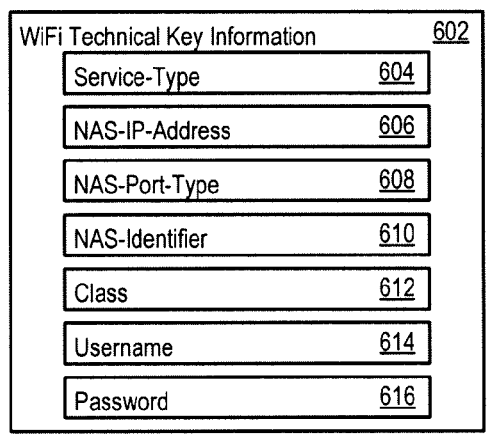
FIG. 6 illustrates technical key information for a WiFi technical key type.

FIG. 6 illustrates an example of WiFi technical key information 602 for a WiFi technical key type. In one implementation, the WiFi technical key information 602 includes the service-type 604, NAS-IP-address 606, NAS-port-type 608, NAS-identifier 610, class 612, username 614 and password 616. In other implementations, the WiFi technical key type may include fewer, more, and/or different types of information.

FIG. 7 illustrates an example of asynchronous transfer mode (ATM) technical key information 702 for an ATM technical key type. In one implementation, the ATM technical key information 702 includes an acct-session-id 704, NAS-identifier 706, NAS-IP-address 708, NAS-port 710, NAS-port-type 712, username 714, password 716, service-type 718, vendor-vsa-port-string 720, connect-info 722, and framed-protocol 724. In other implementations, the ATM technical key type may include fewer, more, and/or different types of information.

FIG. 8 illustrates an example of Ethernet technical key information 802 for an Ethernet technical key type. In one implementation, the Ethernet technical key information 802 may include NAS-identifier 804, NAS-port-id 806, NAS-IP-address 808, NAS-port 810, NAS-port-type 812, calling-session-id 814, username 816, password 818, service-type 820, acct-session-id 822, connect-info 824, and framed-protocol 826. In other implementations, the Ethernet technical key type may include fewer, more, and/or different types of information.

Figure 9:
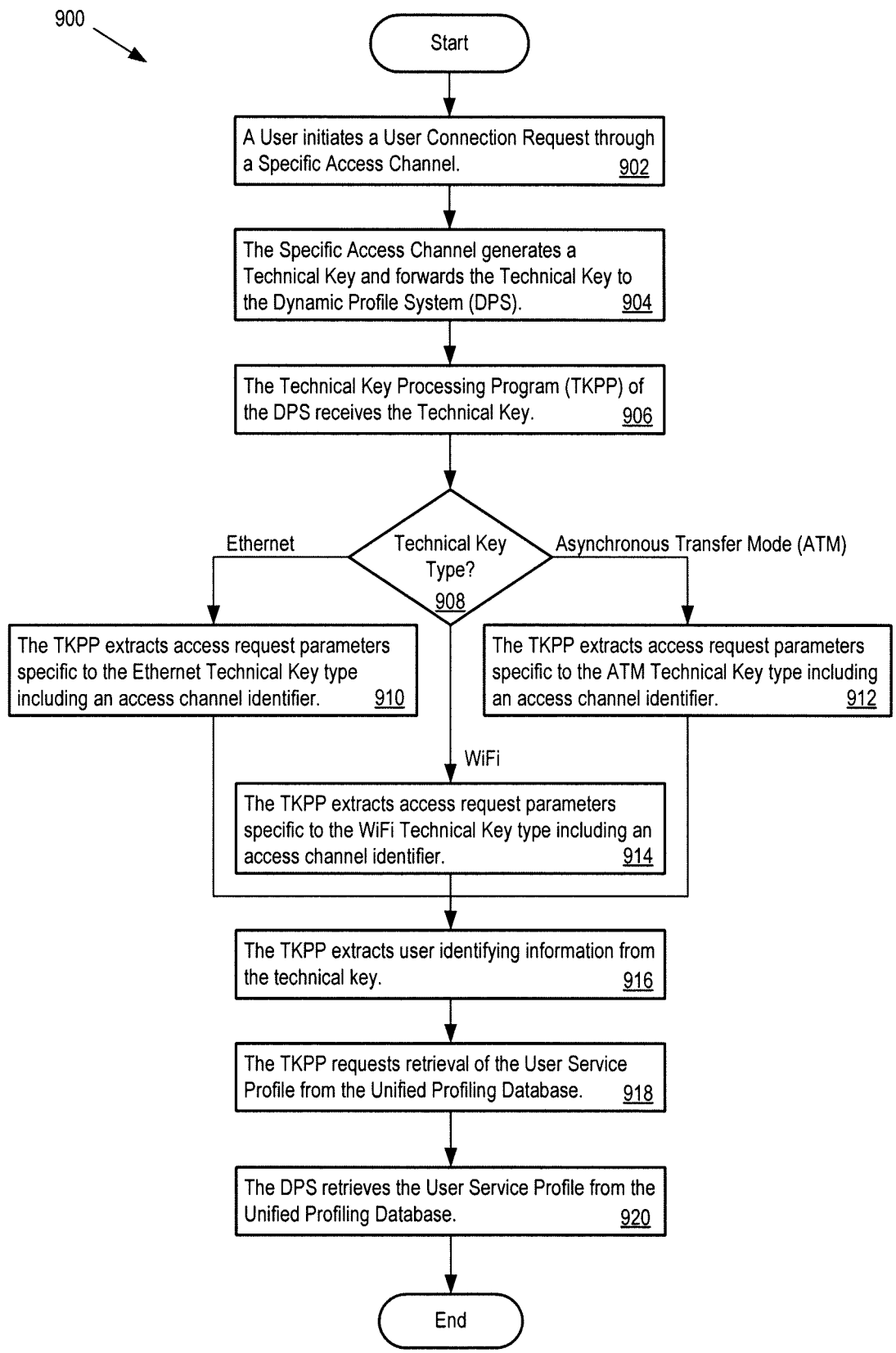
FIG. 9 shows the logic flow in the DPS configuration a technical key processing program may take to request the retrieval of a user service profile.

FIG. 9 shows the logic flow 900 in the DPS configuration 100 that the TKPP 312 may take to request the retrieval of a user service profile 310. A user may initiate a user connection request (e.g., 150, 152, 154, and 210) through a specific access channel (e.g., 134, 136, 138, and 208) (902). For example, a user using their home computer with an Ethernet modem (e.g., an Ethernet type access channel device 138) may initiate a VoIP data connection request through a fast wireline Ethernet access channel (e.g., 148). The specific access channel generates a technical key (e.g., 158, 160, 162, and 302) and forwards the technical key to the DPS 102 (904). For example, Ethernet technical key information 802 generated by the Ethernet access channel 148 for the VoIP data connection request may include predefined values of username and password which allow DPS 102 to distinguish a VoIP data connection from other types of sessions (e.g., different domains may be used such as @spnamevoice.com and @spnamedata.com).

The TKPP 312, as well as various other systems and programs, receives the technical key that is generated in response to the user connection request 210 through the specific access channel (906). The TKPP 312 may distinguish between technical key types generated in response to various user connection requests corresponding to multiple different access channels (908).

In one implementation, the TKPP 312 distinguishes between a wireless access technical key, ATM access technical key, and an Ethernet access request technical key. In the event the TKPP 312 identifies the technical key as an Ethernet technical key type, the TKPP 312 extracts access request parameters specific to a Ethernet technical key type, including an access channel identifier (e.g., NAS-Identifier 804) (910). In the event the TKPP 312 identifies the technical as an ATM technical key type, the TKPP 312 extracts access request parameters specific to an ATM technical key type, including an access channel identifier (e.g., NAS-Identifier 706) (912). In the event the TKPP 312 identifies the technical as an WiFI technical key type, the TKPP 312 extracts access request parameters specific to a WiFi technical key type, including an access channel identifier (e.g., NAS-Identifier 610) (914).

The TKPP 312 extracts user identifying information (e.g., 304, 614, 616, 714, 716, and 816, 818) from the technical key such as username and password (916). In one implementation, the access channel identifier includes the NAS-port-type, NAS-identifier, a NAS-IP address, and a NAS-port-identifier. The TKPP 312 requests retrieval, based on the user identifying information (e.g., 304, 614, 616, 714, 716, and 816, 818), of the USP record 212 from the unified profiling database 114 (918). The TKPP 312 retrieves the USP record 212 from the unified profiling database 114 (920). The TKPP 312 then allows the user to access the network 112 with the appropriate grants set for the various access parameters 504 necessary to provide network services.

Figure 10:
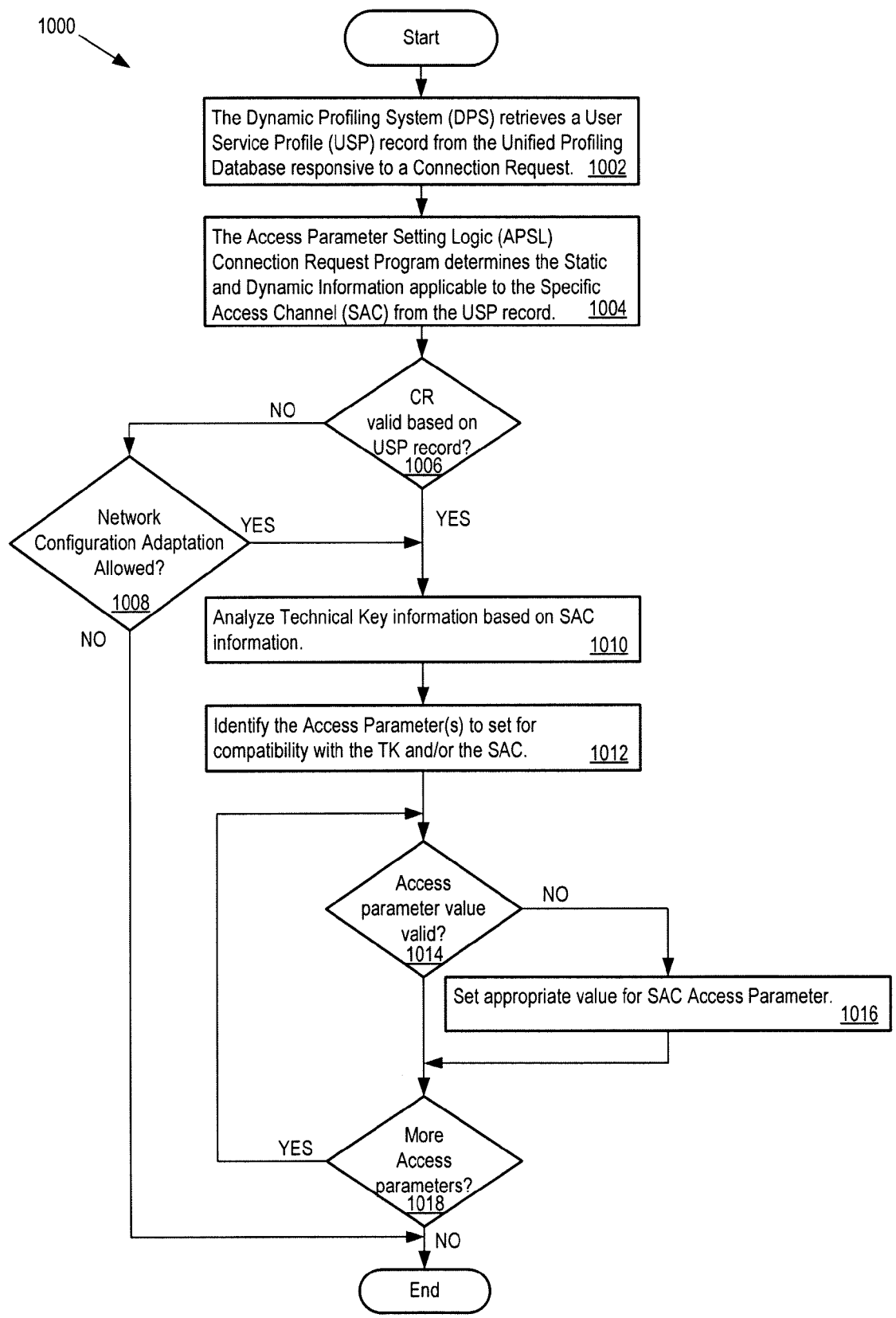
FIG. 10 shows the logic flow in the DPS configuration a connection request program may take to set an access parameter.

FIG. 10 shows the logic flow 1000 in the DPS configuration 100 that the connection request program 502 may take to set an access parameter. The DPS 102 retrieves a USP record 212 from the unified profiling database 114 based on a USP record retrieval request 310 from the TKPL 122 (1002). The connection request program 502 may determine the static connection information 402 and dynamic connection information 404 applicable to the specific access channel from the USP record 212 (1004).

The connection request program 502 validates the connection request 210 against the USP record 212 (1006). The connection request program 502 may validate the connection request 210 by analyzing the static information 402 and dynamic information 404 and the access parameters of the access channel. In the event the connection request 210 is determined to be invalid based on the USP record, in one implementation, the connection request program 502 determines whether a provisioned service 108 allows a network configuration adaptation (1008). In the event the provisioned service 108 allows a network configuration adaptation, then although the connection request 210 may indicate a request for a provisioned service 108 that is not currently provisioned for a user, the access channel and/or network provisions the service. For example, a user may initiate a VoIP data connection request 210, although the user service profile currently indicates that the user service profile is not configured for VoIP data. The user service profile may indicate that based on user account information 420 and/or the billing mode 414 that the user is pre-authorized to use any number of available services. In the event the connection request program 502 determines that network configuration adaptation is allowed and/or that the connection request 210 is valid based on the USP record 212, then the technical key information is analyzed based on the specific access channel information (1010).

The connection request program 502 identifies the access parameters to set for compatibility with the technical key and/or the current values of the specific access channel parameters (1012). For example, access channel parameters for a VoIP data connection may be set to allocate an IP address associated with a high packet prioritization level in order to ensure that a QoS appropriate for VoIP is used (e.g., no packet discarded). Similarly, DPS 102 may determine the IP pool assignment 526 based on different priority levels corresponding to the quality of service (QoS). The connection request program 502 validates the current values of the specific access channel parameters for the connection request 210 (1014) and sets the specific access channel parameters to the appropriate value (1016) for the connection request 210. The connection request program 502 validates the current value of each of the specific access channel parameters for the connection request (1018).

For example, the connection request program 502 may set the access parameters 504 based on the billing mode 414 (e.g., prepaid and postpaid). The prepaid billing mode may include flat-rate and resource usage rate based billing. For example, the DPS 102 may configure a session timeout for a flat-rate prepaid billing mode so that the maximum time available to a user for a network session is based on the credit balance of the user. The maximum time available to the user may also be based on the network resources used by the user during the prepaid billing mode network session. The postpaid billing mode may provide multiple session billing. For example, the DPS 102 may configure access parameters 504 for a postpaid user so that the user may have multiple successive and/or concurrent network sessions. The DPS 102 may configure the access parameters 504 to limit the number of concurrent sessions allowed for the postpaid user.

In one implementation, the connection request program 502 sets the access parameters 504 to indicate an IP pool to assign a session or sessions for a user and the IP address type 512 (e.g., static IP address type 514 and dynamic IP address type 516). The DPS 102 may determine the IP address type 512 to assign to a user based on whether the user is a commercial or residential user and/or the type of network resources desired by the user (e.g., resource utilization scheme 528). For example, a user service profile record 212 may indicate that a static IP address be used for hosting a web site, and a dynamic IP address may be used by WiFi access channel users. The DPS 102 may determine an IP pool assignment 526 based on different priority levels corresponding to the quality of service (QoS) 522 associated with different session types 524 (e.g., Voice, Data and Video). The DPS 102 may determine, through the connection request program 502, the access parameters 504 to set based on any number of resource utilization schemes 528.

Figure 11:
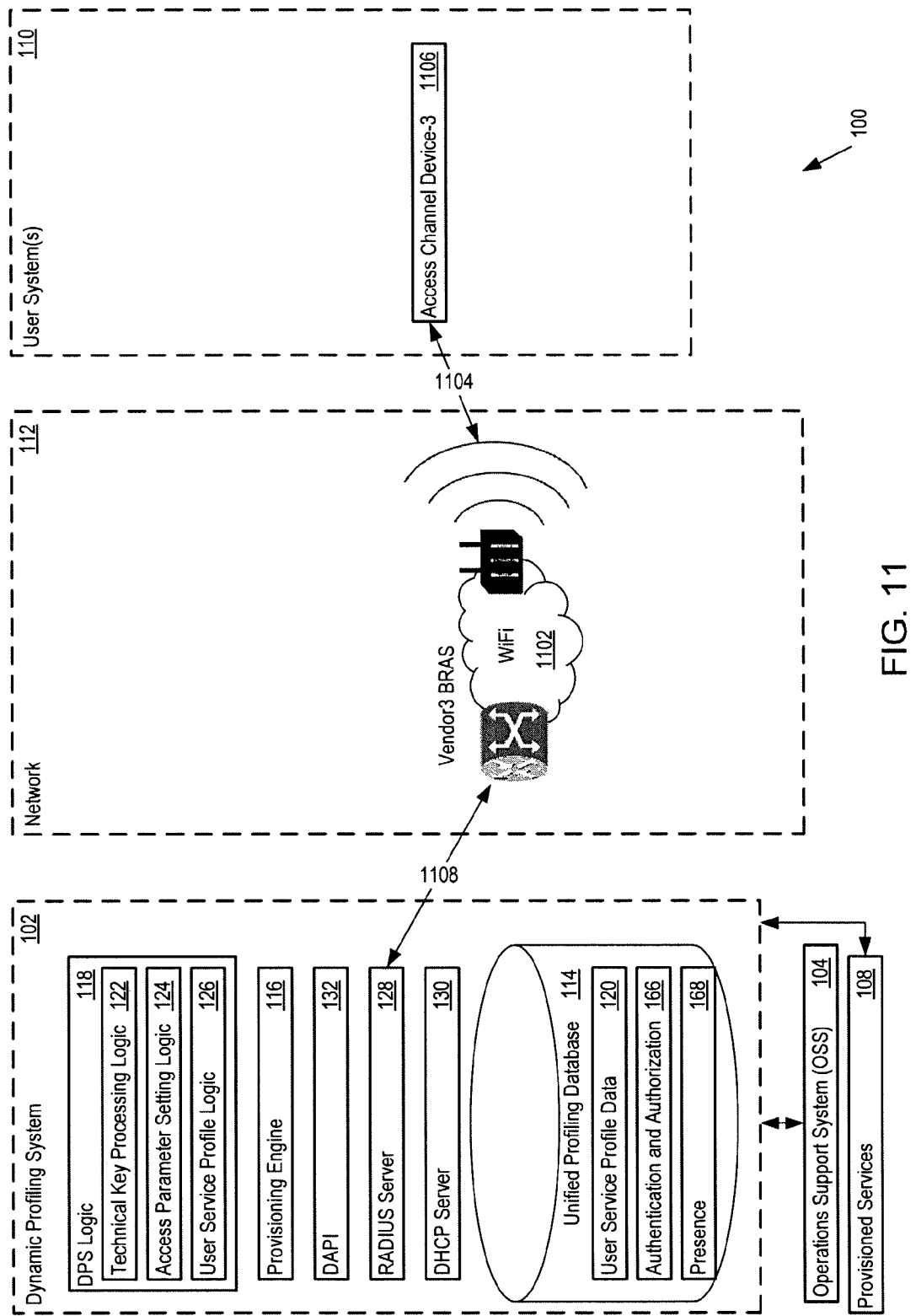
FIG. 11 shows an example of the dynamic profiling system configuration with a WiFi access channel.

FIG. 11 shows an example of the DPS configuration 100 employing a WiFi access channel 1102. The OSS 104 provisions a USP record 212 so that the unified profiling database 114 includes up-to-date user information such as the network resource utilization information. The OSS 104 may provide username, password, the speed allowed, billing type (e.g., flat, pre-paid or post paid), the QoS profile for the access channel being used, and the number of concurrent Wifi connections allowed. The OSS 104 may also indicate whether the WiFi access channel 1102 can be used concurrently with other access channels (e.g., 144 and 146). The user performs a connection request 1104, the communication of which is represented by the arrow drawn from the access channel device 1106 to the access channel 1102. The access channel 1102 generates a WiFi technical key 1108, the communication of which is represented by the arrow drawn from the access channel 1102 to the RADIUS server 128. In one implementation, the RADIUS server 128 initiates dynamic customer detection by retrieving particular user identifying information 304 from the technical key (e.g., 302). The DPS 102 authenticates the user and matches the UPS record 212 to the static connection information 402 and dynamic connection information 404. The DPS 102 allows the user to access the network 112 with the appropriate grants by setting various access parameters 504 as appropriate.

The DPS 102 provides unexpectedly good results for providing dynamic access session configuration information for telecommunications subscribers and subscriber access notifications to application platforms. In particular, as the many different access channels (e.g., WiFi™, ATM, and DSL access) continue to grow through which a subscriber connects to services, the DPS 102 eliminates the inefficient proliferation of custom interfaces between the many support systems and applications that need access to subscriber profile and session configuration information. The DPS 102 provides an aggregated view subscriber profile information and network access information associated with a user, while hiding network complexity and distribution. The unexpectedly good results provided by the DPS 102 include significantly improved universal and personalized access to telecommunications services. Additionally, the DPS 102 is flexible and adaptable to new and different access channel devices used to communicate connection requests through many different access channels without impacting application platforms that deliver services to users.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed:

1. A dynamic profiling system for coordinating telecommunication service access, the dynamic profiling system comprising:
  a unified profiling database comprising a user service profile record of user service profile data comprising static and dynamic connection information for multiple different access channels;
  a processor in communication with the unified profiling database and a memory, the memory comprising:
  technical key processing logic that when executed by the processor causes the processor to:
    receive a technical key generated responsive to a user connection request through a specific access channel;
    extract user identifying information from the technical key;
    extract an access channel identifier of the specific access channel from the technical key;
    distinguish between a wireless access request technical key, an asynchronous transfer mode access technical key, and an Ethernet access request technical key;
    request retrieval, based on the user identifying information, of the user service profile record from the unified profiling database;
  access parameter setting logic that when executed by the processor causes the processor to:
    determine the static and dynamic connection information applicable to the specific access channel from the user service profile record based on the access channel identifier;
    determine an access parameter to set by analyzing the user service profile record, the technical key and the specific access channel, where the access parameter comprises a maximum user session speed assigned for the specific access channel in the user identifying information;
    set an the access parameter that affects bandwidth for the specific access channel according to the static and dynamic connection information obtained based on the access channel identifier; and
    set web surfing constraints to force the user to perform specific tasks following communication of a new marketing solicitation to the user; and
  presence routing logic that when executed by the processor causes the processor to dynamically change the bandwidth by:
    obtaining a user Quality of Service (QoS) profile from the user service profile record;
    determining whether a bandwidth change is permissible for the specific access channel; and
    if permissible, communicating the QoS profile to the application platform to change the bandwidth for the specific access channel.

2. The system of claim 1, where the access channel identifier comprises: a network access server identifier, a network access server internet protocol address, and a network access server port identifier.

3. The system of claim 1, where the technical key comprises: wireless access point access request parameters for the respective wireless access points and where the user identifying information comprises a password and a username.

4. The system of claim 3, where the user identifying information further comprises a network access server port type that identifies the server port type for the network access server port of the network access server and a network access server identifier that identifies the network access server.

5. The system of claim 1, where the access parameter comprises: web site access constraints.

6. The system of claim 1, where the access parameter comprises: an internet protocol address and an internet protocol address type identifier that distinguishes between 'static' and 'dynamic' address types.

7. A product for coordinating telecommunication service access, the product comprising:
  a computer-readable memory comprising:
  user service profile logic stored in the computer-readable memory that when executed by a processor causes the processor to access a unified profiling database comprising a user service profile record of user service profile data comprising static and dynamic connection information for multiple different access channels;
  technical key processing logic stored in the computer-readable memory that when executed by the processor causes the processor to:
    receive, through a network, a technical key generated responsive to a user connection request through a specific access channel;
    extract user identifying information from the technical key;
    extract an access channel identifier of the specific access channel from the technical key;
    distinguish between a wireless access request technical key, an asynchronous transfer mode access technical key, and an Ethernet access request technical key;
    request retrieval, based on the user identifying information, of the user service profile record from the unified profiling database;
  access parameter setting logic in the computer-readable memory and when executed by the processor causes the processor to:

determine the static and dynamic connection information applicable to the specific access channel from the user service profile record based on the access channel identifier;

determine an access parameter to set by analyzing the user service profile record, the technical key and the specific access channel, where the access parameter comprises a maximum user session speed assigned for the specific access channel in the user identifying information;

set an the access parameter that affects bandwidth for the specific access channel according to the static and dynamic connection information obtained based on the access channel identifier; and set web surfing constraints to force the user to perform specific tasks following communication of a new marketing solicitation to the user; and presence routing logic in the computer-readable memory and when executed by the processor cause the processor to dynamically change the bandwidth by:

obtaining a user Quality of Service (QoS) profile from the user service profile record;

determining whether a bandwidth change is permissible for the specific access channel; and if permissible, communicating the QoS profile to the application platform to change the bandwidth for the specific access channel.

8. The product of claim 7, where the access channel identifier comprises: a network access server identifier, a network access server internet protocol address, and a network access server port identifier.

9. The product of claim 7, where the technical key comprises: wireless access point access request parameters for the respective wireless access points and where the user identifying information comprises a password and a username.

10. The product of claim 9, where the user identifying information further comprises a network access server port type that identifies the server port type for the network access server port of the network access server and a network access server identifier that identifies the network access server.

11. The product of claim 7, where the access parameter comprises: web site access constraints, an internet protocol address and an internet protocol address type identifier that distinguishes between 'static' and 'dynamic' address types.

12. A method for coordinating telecommunication service access, the method comprising:

receiving, via a network, a technical key generated responsive to a user connection request through a specific access channel;

extracting, using processor executable instructions stored in a computer memory executed by a processor, user identifying information from the technical key;

extracting, using the processor executable instructions, an access channel identifier of the specific access channel from the technical key;

distinguishing between a wireless access request technical key, an asynchronous transfer mode access technical key, and an Ethernet access request technical key;

requesting retrieval, based on the user identifying information, of a user service profile record from a unified profiling database, the unified profiling database comprising the user service profile record of user service profile data comprising static and dynamic connection information for multiple different access channels;

determining the static and dynamic connection information applicable to the specific access channel from the user service profile record based on the access channel identifier;

determining an access parameter to set by analyzing the user service profile record, the technical key and the specific access channel, where the access parameter comprises a maximum user session speed assigned for the specific access channel in the user identifying information;

setting an the access parameter that affects bandwidth for the specific access channel according to the static and dynamic connection information obtained based on the access channel identifier; and setting web surfing constraints to force the user to perform specific tasks following communication of a new marketing solicitation to the user; and changing dynamically the bandwidth by:

obtaining a user Quality of Service (QoS) profile from the user service profile record;

determining whether a bandwidth change is permissible for the specific access channel; and if permissible, communicating the QoS profile to the application platform to change the bandwidth for the specific access channel.

13. The method of claim 12, where extracting the access channel identifier further comprises: extracting a network access server identifier, a network access server internet protocol address, and a network access server port identifier.

14. The method of claim 12, further comprising extracting wireless access point access request parameters and extracting a password and a username from the user identifying information.

15. The method of claim 14, where extracting the user identifying information further comprises extracting a network access server port type and a network access server identifier.

16. The method of claim 12, where setting the access parameter further comprises: setting web site access constraints, an internet protocol address and an internet protocol address type identifier that distinguishes between 'static' and 'dynamic' address types.

* * * * *